United States Patent
McDaniel et al.

(10) Patent No.: US 6,175,732 B1
(45) Date of Patent: Jan. 16, 2001

(54) SYSTEM FOR FORWARDING AND LOGGING A DIGITAL MESSAGE FROM A TELECOMMUNICATIONS DEVICE

(75) Inventors: David McDaniel, Austin; Jinx R. Smith, Georgetown; Minh L. Phan; Yao-Pao (Frank) Chien, both of Austin, all of TX (US)

(73) Assignee: DSC Telecom L.P., Plano, TX (US)

( * ) Notice: Under 35 U.S.C. 154(b), the term of this patent shall be extended for 0 days.

(21) Appl. No.: 08/990,289

(22) Filed: Dec. 15, 1997

(51) Int. Cl.[7] .............................................. H04Q 7/22
(52) U.S. Cl. ........................... 455/433; 455/414; 379/157
(58) Field of Search ............................ 455/33.1, 406, 455/414, 433, 432, 435, 422, 461, 466, 445, 552, 553, 550, 456, 412; 379/63, 91, 93, 94, 258, 268, 157, 201; 320/259

(56) References Cited

U.S. PATENT DOCUMENTS

| | | | |
|---|---|---|---|
| 5,428,665 | 6/1995 | Lantto | 379/58 |
| 5,490,201 | 2/1996 | Moberg et al. | 379/58 |
| 5,546,444 | 8/1996 | Roach, Jr. et al. | 379/59 |
| 5,557,655 | 9/1996 | Lantto | 379/58 |
| 5,577,102 | 11/1996 | Koivunen | 379/59 |
| 5,577,103 | 11/1996 | Foti | 379/59 |
| 5,579,375 | 11/1996 | Ginter | 379/59 |
| 5,594,739 | 1/1997 | Lemieux | 570/350 |
| 5,594,740 | 1/1997 | LaDue | 379/59 |
| 5,719,918 | 2/1998 | Serbetciouglu et al. | 379/58 |
| 5,751,802 | 5/1998 | Carr et al. | 379/201 |
| 5,771,455 | * 6/1998 | Kennedy, III et al. | 455/456 |
| 5,781,857 | * 7/1998 | Hwang et al. | 455/412 |
| 5,878,397 | * 3/1999 | Stille et al. | 704/466 |
| 5,884,157 | * 3/1999 | Karmi | 455/406 |
| 5,901,359 | * 5/1999 | Malmstrom | 455/461 |
| 5,905,958 | * 5/1999 | Houde | 455/437 |
| 5,920,820 | * 7/1999 | Qureshi et al. | 455/461 |

FOREIGN PATENT DOCUMENTS

96/13949  * 10/1995  (WO) .............................. H04Q/7/24

* cited by examiner

Primary Examiner—Daniel S. Hunter
Assistant Examiner—Pablo N. Tran
(74) Attorney, Agent, or Firm—Kenyon & Kenyon (57) ABSTRACT

A system is provided for logging digital messages and forwarding them outside a proprietary telecommunications network. The system includes a service logic program ("SLP") which determines whether the message is to be forwarded outside the proprietary system. If the message is to be forwarded outside the system, the SLP sends it to the main relay, which logs the message to a log file, and forwards it to a discriminator. The discriminator forwards the message to a sub-relay, which is connected to a vendor application. The sub-relay forwards the message outside the proprietary telecommunications system, to the vendor application.

20 Claims, 10 Drawing Sheets

FIG. 1

Digital Message 200

| Byte Number | Field | |
|---|---|---|
| 00-03 | Host ID (4 bytes) | 201 |
| 04-11 | Sequence ID (8 bytes) | 202 |
| 12-15 | Time in seconds since 00:00 1/1/1970 (4 bytes) | 203 |
| 16-17 | and milli-seconds (2 bytes) | 204 |
| 18-27 | MIN (10 bytes) | 205 |
| 28-31 | MSN (4 bytes) | 206 |
| 32-63 | Dialed digits (32 bytes) | 207 |
| 64-67 | Message Rate (4 bytes) | 208 |
| 68-71 | Vendor Number (4 bytes) | 209 |
| 72-77 | Host Name (6 bytes) | 210 |
| 78-91 | Service Name (14 bytes) | 211 |
| 92-155 | Other data (64 bytes) | 212 |

Total 156 bytes

SYSTEM FOR FORWARDING AND LOGGING A DIGITAL MESSAGE FROM A TELECOMMUNICATIONS DEVICE

FIELD OF THE INVENTION

The present invention relates to a system for forwarding and logging a digital message, especially as applied to a digital message originated by a cellular telephone or other telecommunications device.

BACKGROUND INFORMATION

The present invention relates to cellular radio and telephone networks. These networks generally consist of mobile communications units (e.g., cellular telephones) which users employ to send radio signals carrying voice data over the air to other users. A mobile unit sends a signal which is received by a base station for the area or "cell" in which the mobile unit is located. The base station forwards the signal to a mobile services switching center, which routes the signal to its destination. This destination may be a ground-based telephone network or another base station which will re-broadcast the signal to another mobile unit. In either case, the signal is routed through a cellular telecommunications network before being either re-broadcast to another mobile unit or forwarded to the ground-based telephone network.

The cellular telecommunications network referenced above includes base stations strategically located in a geographical service area (each including an antenna, a base station controller, and a transceiver). Each base station is connected to a mobile switching center, with each mobile switching center serving several base stations. The mobile switching center is, generally, a small facility located between the base stations it serves and a centralized facility for the network. A home location register (HLR) is located at the centralized network facility, and serves all the mobile switching centers for the network. The HLR stores and provides access to network subscriber data. The HLR stores, for example, data describing a network subscriber's home network, type or level of service, and other subscription information. Each mobile switching center contains a visitors' location register ("VLR"), which registers users who access the network, but who are not listed in the network HLR because they are geographically located outside their home network when they access the cellular communications system. The VLR communicates with HLRs across the system to obtain user data about the users who access the network.

In addition to sending voice data signals carrying voice data, mobile units send digital messages to a telecommunications network. These messages can be used to, for example, change a subscriber's level of service, change a subscriber's service options, or change a subscriber's registered number to which incoming calls to the subscriber are to be forwarded. Like voice data signals, messages are also received by base stations and forwarded to mobile services switching centers. However, messages are then processed by the network, rather than forwarded to, or linked in communication with, another user. The messages may be processed and implemented by the HLR or another component of the network designed to act on the information specified in the message. The messages can operate as commands with regard to these components. These components of communications networks generally comprise standard microcomputers which are programmed to receive digital messages from mobile units forwarded via a base station. The computers, based on the messages, perform operations such as changing a subscriber's service options, or changing a number to which a subscriber's calls should be forwarded.

Current telecommunications systems have the capability of remote feature control, allowing a subscriber to, for example, establish an account, change a password, change a level of service, or change other service features such as call forwarding options. The current remote feature control systems receive messages through an HLR. All these functions are performed within the telecommunications network without the need for forwarding messages to outside, often incompatible, systems operated by outside vendors.

In current systems, messages are received by an HLR and either processed within the HLR or processed by another component of the network developed to perform the function specified by the message. The component processes the message according to the message contents and initiates the feature requested by the message. For example, a message requesting an updating of a call forwarding number contains a certain code signaling the network that it is a call forwarding number update request. A network component reads this code and determines that the message is not to be terminated within that component, but should be forwarded to a component within the network specifically designed to handle call forwarding. The component in which the message is to be terminated then initiates the call forwarding number updating sequence.

Current systems provide only for forwarding of messages within a network. New applications for the use of over-the-air digital messages require the forwarding of messages outside the network. Beyond changing user and service options, digital messages transmitted by mobile units can be used, for example, to provide information from remote locations to centralized databases (e.g. gas, water, or electric meter readings provided directly into a company database), or to transmit a specific geographical location of a user, or to provide commands to remotely-located devices (e.g. a power on/power off command).

U.S. Pat. No. 5,577,102 describes a system for processing short messages in a cellular telephone network. The system is designed to be a simple method for transmitting short messages from one subscriber on a cellular network to another subscriber. A message is received by a mobile switching center, which then checks the message address, stores the message, communicates with an HLR to obtain routing information, and transmits the message to the intended subscriber. This system receives, processes, and forwards digital messages within a cellular telecommunications network. It does not forward messages outside the network.

U.S. Pat. No. 5,428,665 describes a method for managing supplementary service procedures in a global system for mobile communications. Mobile stations send messages which are to be processed either in a mobile services switching center/visitor location register (MSC/VLR), or in a home location register (HLR). The MSC/VLR forwards messages destined for the HLR to the HLR, without seeing their contents or processing them in any other way. Messages to be terminated within the MSC/VLR are kept by the MSC/VLR and processed internally.

U.S. Pat. No. 5,594,740 describes a method and apparatus for using the control channels of an existing cellular telephone network to transmit and receive two-way wireless data messages. The system includes manipulation, translation, and encryption of control channel data bits, and provides for application-specific messaging on the control channels of an existing telecommunications network. This system does not provide for forwarding of application-specific messages outside a telecommunications network.

SUMMARY OF THE INVENTION

In an exemplary embodiment of the present invention, a system including multi-threaded processes is provided for forwarding digital messages outside a telecommunications network, and for logging those messages for billing purposes, for example. The system receives a message and determines whether the message should be processed within the network, or should be forwarded outside the network, for example, to a vendor application. The system employs a home location register (HLR), running a service logic program (SLP), a plurality of relays (implemented as a main relay and one or more sub-relays), a discriminator, and message log files, and complies with the IS41 telecommunications standard.

In an exemplary embodiment, the SLP receives a digital message from a telecommunications device and determines whether the message is to be forwarded outside the network. If the message is to be forwarded, the SLP formats the message and sends it to the main relay. When the main relay receives a message from the SLP, the main relay writes the message to a log file. The main relay then forwards the message to the discriminator which, based on information contained in the message, routes the message to one of the sub-relays. Each main relay and sub-relay is in read/write communication with a log file. The sub-relay receiving the message sends the message to a specific vendor application via a vendor-relay which is outside the telecommunications network.

The relay/discriminator/sub-relay system operates as an interface between the telecommunications network and an outside system, forwarding messages from the telecommunications network to the outside system where they are processed and used for the specific business application of the outside vendor.

DETAILED DESCRIPTION

Figure 1:
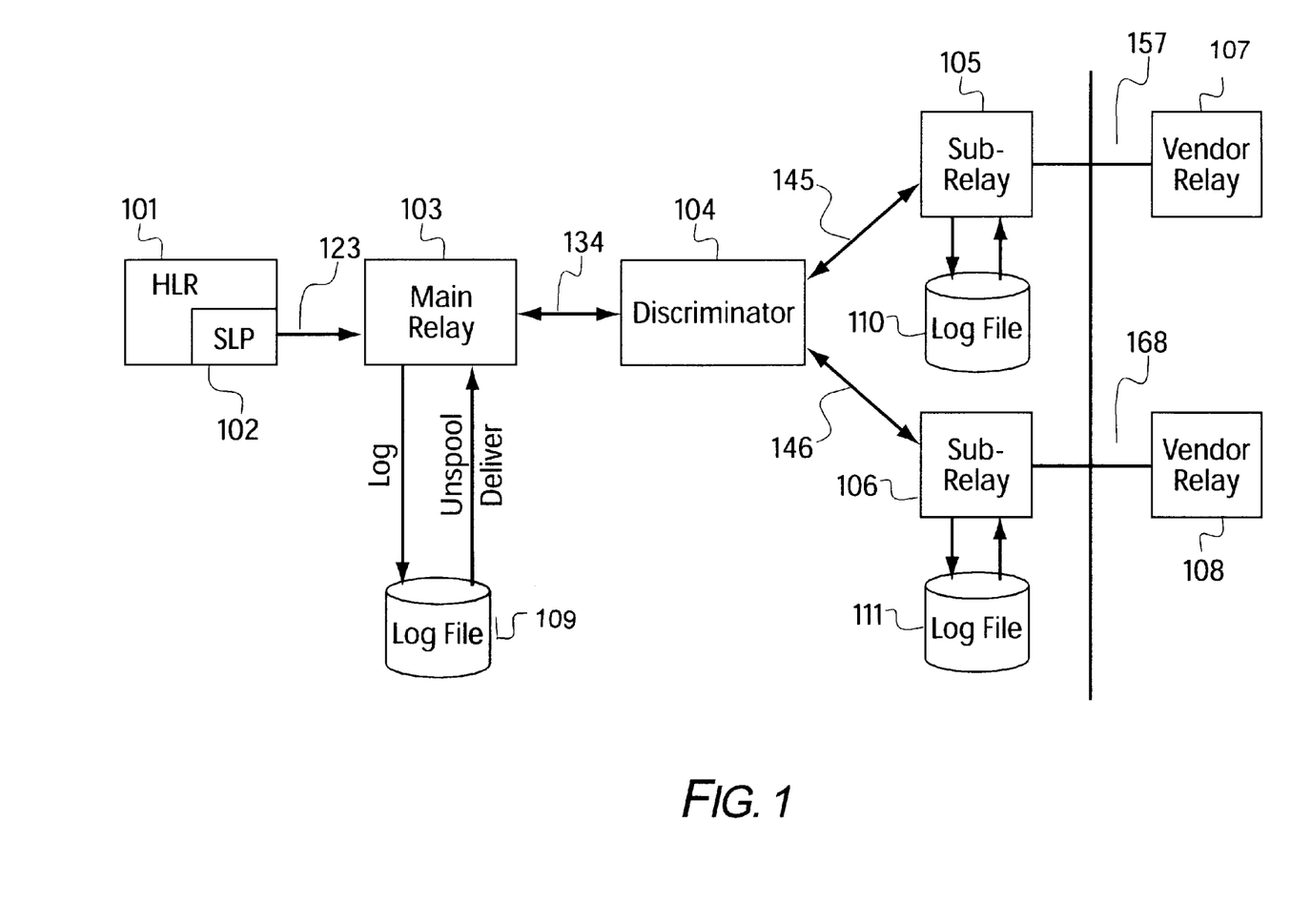
FIG. 1 is a block diagram of the overall system architecture of an exemplary embodiment of the present invention.

Architectural Overview: Referring initially to FIG. 1, a block diagram of the overall system architecture of an exemplary embodiment of the present invention is illustrated. An HLR 101 is provided, which comprises a digital computer, such as, for example, a Sun Microsystems™ SPARC® or UltraSPARC® workstation. The HLR 101 executes an HLR software program. The HLR 101 includes a database containing network subscriber data (such as user identification numbers) and message destination data (such as host names, network service names, and vendor identification numbers). Additionally, the HLR 101 executes an SLP 102.

The SLP 102 is a process that determines whether messages should be processed by the HLR 101, or forwarded to an outside vendor. In the exemplary embodiment of the present invention, the SLP 102 is created using a Service Creation Environment (SCE), a software tool used for the creation and monitoring of complex software programs for telecommunications networks. The SCE allows designers to put together pre-written independent building blocks of code using flow charts and an interactive graphics editor.

The SCE enables an SLP designer to design a new SLP in a window-driven interactive environment. The designer begins designing a new specific SLP by installing a generic SLP (provided by the SCE). The designer then customizes the generic SLP, as required, to transform it into a specific SLP designed for the specific requirements of the designer. Finally, the designer tests the SLP with the animation feature of the SCE.

The designer installs a generic SLP by clicking a mouse button on a generic SLP icon, and then selecting the create function. The designer can then construct the generic SLP by inserting and connecting service independent building blocks (SIBs). SIBs are blocks of code which are independent of service applications. In accordance with the exemplary embodiment, the SIBs are represented as flow-chart objects. An SIB may be an entry SIB, an input SIB, or a decision SIB. Clicking on an SIB will display a parameters window which the designer can use to modify the parameters of the SIB. Once the generic SLP is created, it is stored by clicking the "save" icon button, before the SLP is modified into a specific SLP.

To modify the generic SLP into a specific SLP, the designer first sets up subscribers. The designer allocates a service number and a service name to the SLP. The designer clicks on a "create" button and then enters the service number. By clicking on a "select service" button, the designer allocates the service to an existing subscriber. To create a new subscriber, the designer clicks a "create subscriber" button and inputs the subscriber number, the subscriber name, and the triggers for the SLP. Once this is complete, the designer switches the SCE to subscriber mode, allowing the subscriber to modify the generic SLP.

To edit the generic SLP, the designer can click on each SIB to bring up an edit parameter window. Modifications are made in this window, and then applied to the SIB when the window is closed. When the SLP modifications are complete, the SLP is stored as a specific SLP by clicking a save edit button.

The new specific SLP is then tested using the features of the SCE. This function employs intelligent network application and animation and monitoring control windows and a service switching point window to simulate phone calls. The SCE offers evaluation animation of the operation of the SLP.

The specific SLP 102 of the present invention is coupled to a main relay 103, via a standard Transmission Control Protocol/Internet Protocol (TCP/IP) connection 123. The main relay 103 is a process implemented in software which can run on the HLR 101, or on a separate computer (e.g. a Sun Microsystems™ SPARC® or Ultra SPARC®, or a standard desktop personal computer).

The main relay 103 (implemented in, for example, the C++ programming language) relays messages received from the SLP 102 to a discriminator 104.

Additionally, the main relay 103 logs each message into a log file 109 via a file I/O system call. In the exemplary embodiment, the log file 109 is stored on a hard drive local to the computer executing the main relay 103.

The main relay 103 is coupled to the discriminator 104 via a TCP/IP connection 134. The discriminator 104 is a process implemented in software (e.g., in the C++ programming language) which can run on the same computer as the main relay 103 or on a separate computer connected to the main relay 103. The discriminator 104 receives messages from the main relay 103 and forwards each received message to an appropriate sub-relay 105, 106.

The discriminator 104 is coupled to two sub-relays 105, 106. Although two sub-relays 105, 106 are illustrated, the system of the present invention can include any number of sub-relays.

Each sub-relay 105, 106 is a process implemented in software (e.g., in the C++ programming language) which can run on the same computer as the discriminator 104, or on a separate computer connected to the discriminator 104 via TCP/IP connections 145, 146. This computer may be, for example, a Sun Microsystems™ SPARC® or Ultra SPARC®, or a standard desktop personal computer. Multiple sub-relays may run on the same computer, or each sub-relay may run on a separate computer.

Each sub-relay 105, 106 is connected to a respective vendor relay 107, 108 via a TCP/IP connection 157, 168. Each sub-relay receives messages from the discriminator 104 and relays the received messages to the respective vendor relay 107, 108 that is outside the telecommunication network.

Additionally, each sub-relay 105, 106 logs each message it receives into a respective log file 110, 111 via a file I/O system call. In the exemplary embodiment, each of the log files 110, 111 is stored on a hard drive local to the computer executing the respective sub-relay 105, 106.

The vendor relays 107, 108 are executed on computers separate from the sub-relays 105, 106, and outside of the telecommunications network. Furthermore, in the exemplary embodiment, each of the vendor relays 107, 108 is executed on a separate, individual computer. The vendor relays 107, 108 are portions of vendor applications that receive the messages that are processed by vendor applications.

Operational Overview: In operation, in the exemplary embodiment of the present invention, the HLR 101 receives a digital message, which has been forwarded from a base station via a mobile services switching center. The format of the digital message is that of a remote feature control message according to the IS41 telecommunications standard, and includes a field containing a mobile identification number (MIN), a field containing a mobile serial number (MSN), and a field containing the user's dialed digits. The message is processed and formatted by the SLP 102. The SLP 102 determines whether the digital message is to be forwarded to an outside vendor by mapping the MIN into a database. In particular, the SLP 102 searches the database to determine if the MIN of the message is contained within the MIN ranges listed in the database. If the MIN is found to be within one of those ranges, the SLP retrieves the information corresponding to that range from the database and constructs a message in the format that is later described in connection with FIG. 2. The SLP 102 then forwards the message to the main relay 103 through the TCP/IP connection 123. If the MIN of the message is not found within the ranges contained in the database, the message is not to be forwarded, and the SLP 102 processes the message internally.

The main relay 103 writes a record ID into designated fields of the message. The record ID identifies the main relay and serves to uniquely identify the message. The main relay 103 then writes (i.e., "logs") the message to the log file 109, and forwards the message to the discriminator 104 through the TCP/IP connection 134.

In the exemplary embodiment, the main relay 103 includes objects such as a log manager object ("LogMgr") and a relay manager object ("Mgr"), and is implemented as a multi-threaded process. A multi-threaded process operates by creating several "threads", or "lightweight" processes, which can operate simultaneously. These threads are member functions of the Mgr object. Lightweight processes are mini-processes which can communicate with each other through simple memory read/write commands, in contrast to "full" processes which must communicate through TCP/IP interfaces. A multi-threaded process operates like a multi-tasking system except that the communication between threads requires fewer resources than communication between the processes of a multi-tasking system. The threads can communicate through simple memory read/write functions, avoiding the need to go through the operating system.

The main relay 103 creates separate threads to communicate with individual clients and can therefore communicate with a number of clients simultaneously.

The main relay 103 operates as a server from the TCP/IP network connection point of view. Client/server architecture describes a common form of distributed system in which software is split between server tasks and client tasks. A client sends requests to a server, according to some protocol, asking for information or action, and the server responds by providing the information or performing the action and sending a confirmation message back to the client.

As a server, the main relay 103 allows connections by external clients (not shown in FIG. 1). These external clients are software processes which can reside on the same computer as the main relay 103, or on a different computer. When clients connect to the main relay 103, the main relay 103 creates threads for each one (managed by the Mgr) to communicate with the clients. These clients may require information from the log file 109 to perform their functions, such as determining whether or not there are any unforwarded messages stored in the log file 109, or archiving the sent messages from the log file 109 so that space in the log file 109 can be cleared for new messages.

A client, for example an archive process, can request "unspooling" of messages from the log file 109. This request is sent from the thread, through the LogMgr. The LogMgr manages the interaction between the main relay 103 and the log file 109, and performs the write/read functions necessary to carry out the functions of the main relay 103 and the requests of the clients. The main relay 103 also includes a record map, which is a data structure that acts as a "dictionary" or "map" of the contents of the log file 109.

An archive process, for example, may request that all "sent" messages be unspooled. The LogMgr looks up the messages marked "sent" in the record map to determine their locations in the log file 109. The LogMgr then reads each sent message from the log file 109, marks the message as copied or archived, and writes the message to a temporary file. The main relay 103 then sends an acknowledgment message to the archive process. The archive process sends an acknowledgment message back to the main relay 103. The LogMgr then marks the copied or archived messages to be overwritten, and removes their entries from the record map. Finally, the archive process retrieves the temporary file. The messages in the log file 109 that were unspooled can then be overwritten. This effectively deletes the unspooled messages, and increases available space in the log file 109.

The discriminator 104 receives a message from the main relay 103, and forwards the message to the proper destination sub-relay 105, 106 based on routing information contained in the message.

The sub-relay 105, 106 logs the received message to its log file 110, 111 and passes the message to its respective vendor relay 107, 108 for further processing in accordance with the function of the vendor application corresponding to the vendor relay 107, 108.

In an exemplary embodiment of the system, the sub-relays 105, 106 comprise essentially the same software as the main relay 103, and thus operate in substantially the same way as the main relay 103. Accordingly, the general operation of the sub-relays 105, 106 is substantially the same as described above in connection with the main relay 103, except that the sub-relays 105, 106 process messages received from the discriminator 104 (rather than from the SLP 102), and relay the processed messages to vendor relays 107, 108 (rather than relaying the messages to the discriminator 104).

The HLR 101 software, SLP 102, main relay 103, discriminator 104, and the sub-relays 105, 106 can run on the same computer. However, running the discriminator 104 and the sub-relays 105, 106 on separate computers saves memory space in the HLR 101 and reduces the general load on the HLR 101, making the system more efficient.

Figure 2:
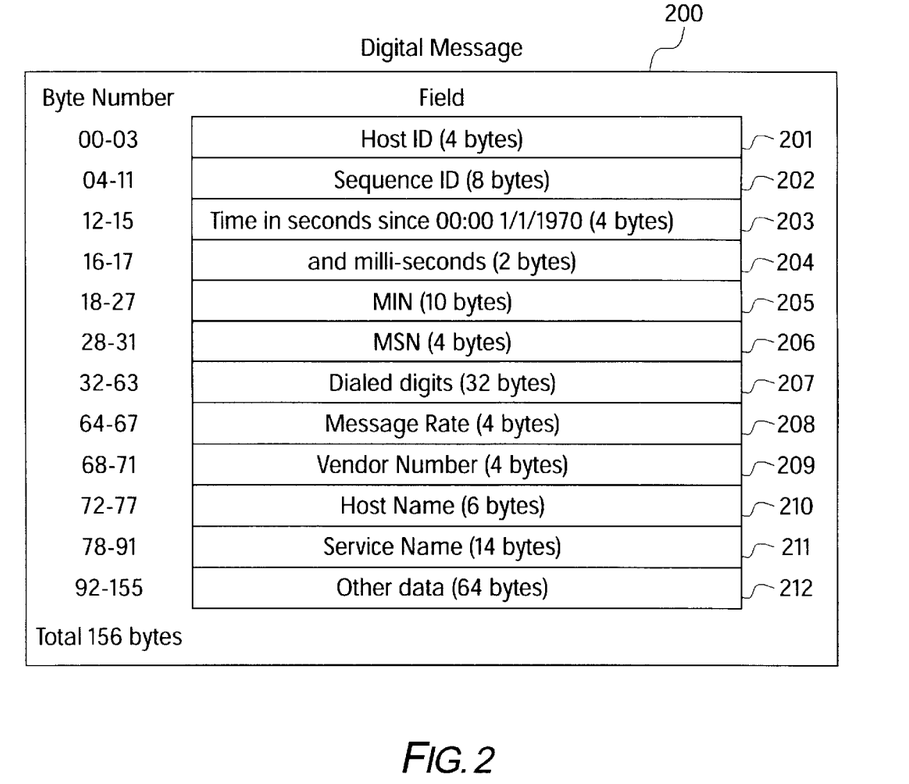
FIG. 2 illustrates the structure of an exemplary digital message.

Message Structure: In an exemplary embodiment of the present invention, the messages that are forwarded to outside vendors are structured as illustrated in FIG. 2. A digital message 200 can comprise, for example, 156 bytes of digital information, divided into different fields.

In this exemplary embodiment, a Host ID field 201 is provided at bytes 0–3 of the message. The Host ID field 201 identifies the main relay 103 which forwarded the message, and the computer upon which it executes. A Sequence ID field 202 is located at byes 4–11 of the message. The Sequence ID field 202 is a sequence number assigned by the main relay 103. The main relay 103 increments this sequence number for each forwarded message. The Host ID field 201 and the Sequence ID field 202 together make up a record ID which uniquely identifies the message.

A Time Stamp field 203, 204 provides a time stamp for the message. The Time Stamp field 203, 204 occupies bytes 12–15 and 16–17 of the message.

At bytes 18–27, a Mobile Identification Number field (MIN) field 205 is provided. The MIN field 205 identifies the mobile user that sent the message.

A Mobile Serial Number (MSN) field 206 is provided at bytes 28–31 of the message. The MSN field 206 provides the serial number that is hard-wired into the mobile unit that sent the message.

A Dialed Digits field 207 at bytes 32–63 of the message provides the sequence of digits dialed at the mobile unit.

A Message Rate field 208 is provided at bytes 64–67 of the message.

At bytes 68–71 of the message, a Vendor Number field 209 is provided.

A Host Name field 210 and a Service Name field 211 are provided at bytes 72–77 and 78–91 respectively. The information in the Host Name field 210 and the Service Name field 211 are read from a database by the SLP 102, and are used by the discriminator 104 to determine to which sub-relay the message should be forwarded.

At bytes 92–155 of the message, other data 212 is stored.

Figure 3:
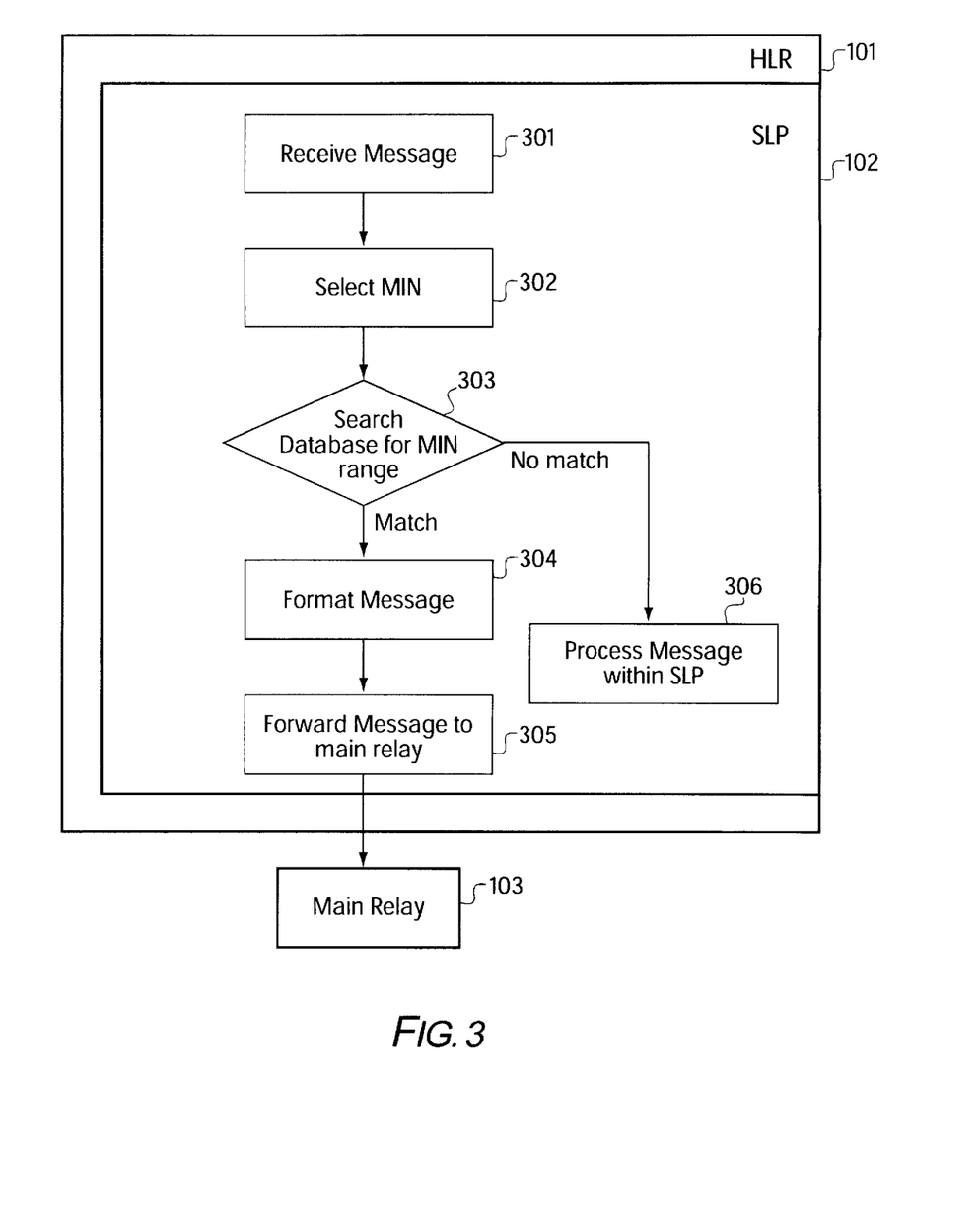
FIG. 3 is a flowchart of a portion of a Service Logic Program (SLP).

SLP Process: The process illustrated in FIG. 3 shows the portion of the SLP 102 relevant to the present invention, which determines whether a message is addressed to a vendor application, or is to be retained and processed by the HLR 101. As shown, the SLP 102 receives a message (step 301). This message is, for example, forwarded from a base station through a mobile switching center.

Next, the Mobile Identification Number (MIN) in the message is obtained (step 302) and used to search a database (step 303). The database contains a list of MIN ranges, correlated with a list of message rates, a list of host names, a list of service names, a list of vendor numbers, and a list of variable-length character strings. If the MIN is found to fall within one of the MIN ranges listed in the database, the SLP 102 formats the message as shown in FIG. 2 by filling the designated fields with the corresponding information from the database (step 304). As part of the formatting procedure, the SLP also writes a time stamp into the designated fields in the message. The SLP 102 then forwards the message to the main relay 103 via TCP/IP interface 123 (step 305). If the MIN is not found in the ranges contained in the database, a "No Match" is returned and the message is further processed internally by the SLP 102 (step 306).

Figure 4:
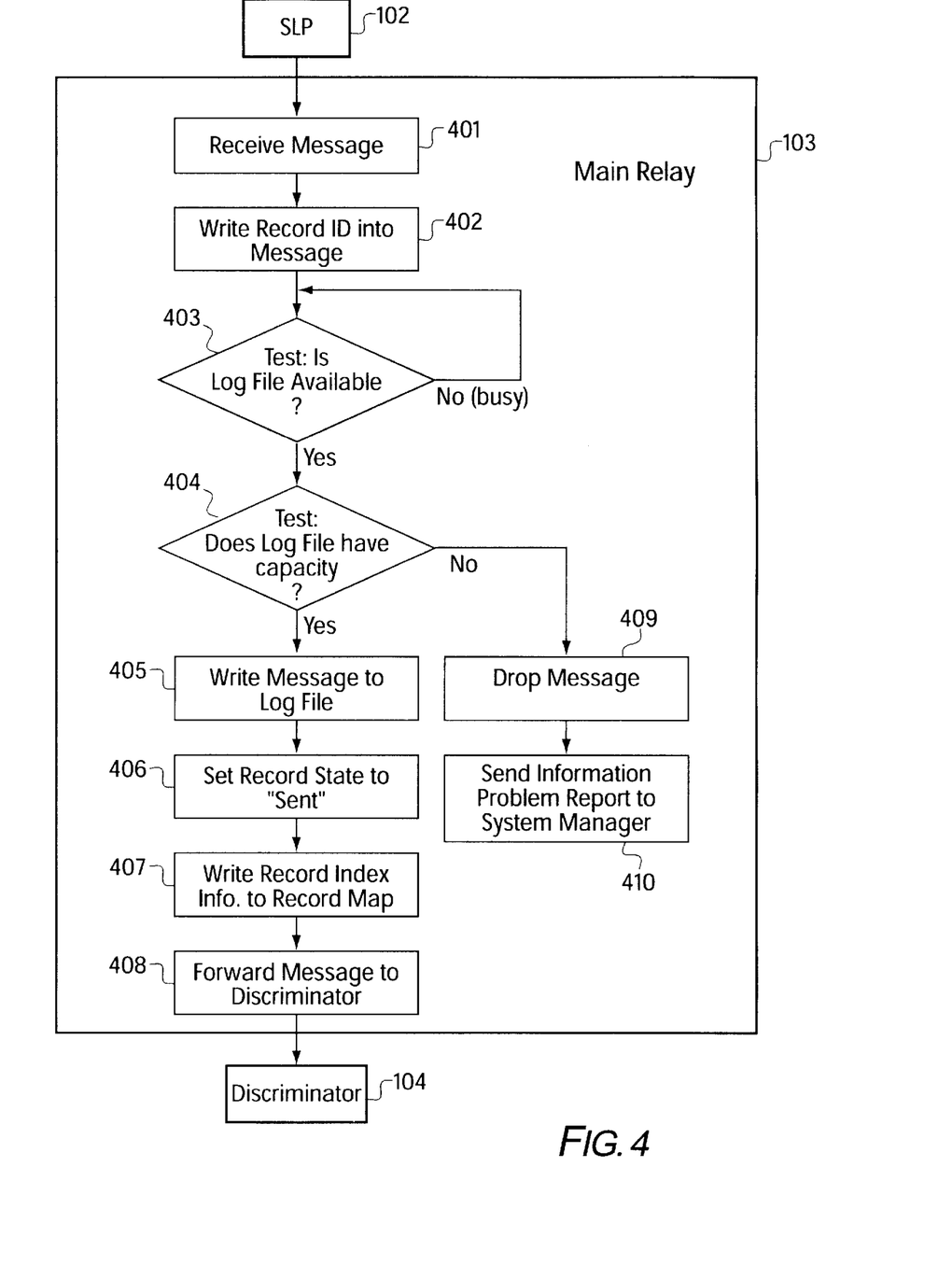
FIG. 4 is a flowchart of an exemplary main relay process.

Main Relay Process: When the main relay 103 receives a message from the SLP 102, the main relay 103 logs the message to the log file 109, and forwards the message to the discriminator 104. In addition, the main relay 103 unspools records from the log file upon request from a client, e.g. an archive process.

Since the main relay is a multi-threaded process, the log file 109 is carefully synchronized so that the log file 109 is not accessed by more than one thread at a time. In accordance with the exemplary embodiment of the present invention, the synchronization of the log file connections is accomplished through the use of a semaphore. A semaphore is an access bit which allows for only single user read and single user write functions and is known and used in the art for synchronization tasks. When a thread accesses the log file 109, the semaphore bit is set. When the semaphore bit is set, no other threads can access the log file 109. Each thread which accesses the log file 109 attempts to get as much data through as possible, and also tries to release the semaphore as soon as possible. The write/read functions performed to/from the log file 109 are performed and controlled by the LogMgr.

FIG. 4 is a flowchart of the main relay 103 process. The main relay 103 is a multi-threaded program implemented as a server from the TCP/IP network connection point of view. In the exemplary embodiment of the present invention, the SLP 102 is the left-hand client of the main relay 103, and the discriminator 104 is the right-hand client of the main relay 103.

Referring now to the flowchart of FIG. 4, the main relay 103 receives a message from the SLP 102 (step 401). The main relay 103 writes a record ID comprising a Host ID 201 and a Sequence ID 202 into the designated fields of the message (step 402). The Host ID uniquely identifies the main relay 103. The sequence ID 202 is a sequential number incremented by the main relay 103 for each message received by the main relay 103.

The main relay 103 then tests the semaphore to determine if the log file 109 is available to receive a message (step 403). If the main relay 103 determines that the log file 109 is busy (i.e. the semaphore is set) the main relay 103 waits until the log file becomes available.

If the main relay 103 determines, that the log file is not available because the log file is full (step 404), the main relay 103 drops the message (step 409). Dropped messages are deleted from temporary memory and are completely lost from the system. The main relay 103 will then send an information problem report to the system manager (step 410).

If the log file 109 is not busy or full, the main relay 103 writes the message to the log file 109 (step 405). The main relay 103 then writes the record state to the log file 109, setting it as "sent" (step 406). The main relay 103 then writes the record index information into the record map (step 407). The main relay 103 then forwards the message to the discriminator 104 through the TCP/IP connection 134 (step 408).

Figure 5:
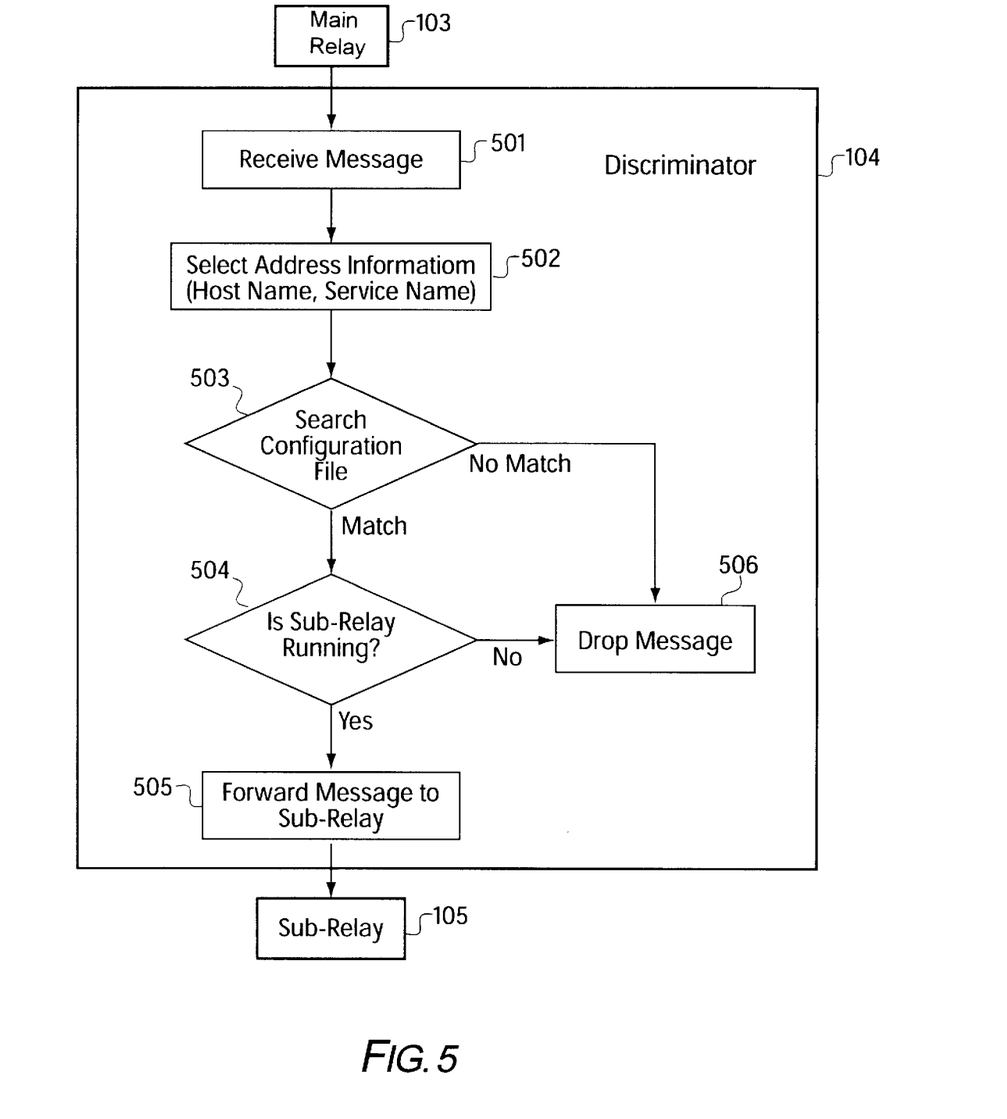
FIG. 5 is a flowchart of an exemplary discriminator process.

Discriminator Process: FIG. 5 is a flowchart of the discriminator 104 process. The discriminator 104 operates as a client to the main relay 103 and to the sub-relays 105, 106 from the TCP/IP connection point of view. When the discriminator 104 first starts up, it reads a configuration file which resides on the same computer as the discriminator. The configuration file lists the host name, service name, and server type of each of the servers to which the discriminator should attempt a connection. The server type defines whether the server is to be a "left hand" server (main relay) to the discriminator or a "right hand" server (sub-relay) to the discriminator. The discriminator then attempts to establish connections with the main relay 103 and the sub-relays 105, 106 specified in the configuration file. After making the connections specified in the configuration file, the discriminator 104 waits for a message to be forwarded from the main relay 103.

In accordance with the exemplary embodiment, the discriminator 104 receives a message from the main relay 103 (step 501). Next, the discriminator 104 obtains address information comprising the Host Name 210 and Service Name 211 from the received message (step 502). The discriminator 104 then compares the Host Name 210 and network Service Name 211 to the entries in the configuration file (step 503).

If the discriminator 104 does not find a match, or the discriminator 104 finds that the destination sub-relay 105, 106 is not running (i.e. down)(step 504), the discriminator 104 drops the message (step 506). The dropped message will be lost from the discriminator, but, unlike the case where the main relay drops a message, the message is not lost from the system because it has been written into the log file 109 of the main relay 103.

If a match is found, the discriminator 104 forwards the message to the sub-relay 105, 106 (identified by the host name and service name) through a TCP/IP interface 145, 146 (step 505).

If a sub-relay 105, 106 goes down (as the result of a normal shutdown or a sub-relay failure), it will not accept TCP/IP connections until it is able to re-initialize. Once the sub-relay 105, 106 re-initializes, the discriminator 104 will re-initialize to re-establish the sub-relay connection. When the discriminator 104 re-initializes, it sends a message to the main relay 103 requesting that all messages that were marked as "sent" in the log file, but for which no acknowledgment message has been received, be re-sent to the discriminator 104.

Sub-Relay Process: Referring now to the flowchart of FIG. 6, an exemplary sub-relay 105 process is illustrated (the same process is also performed by each of the other sub-relays of the system). As described above, each of the sub-relays 105, 106 perform similar functions as the main-relay 103. Accordingly, in the exemplary embodiment of the present invention, each of the sub-relays 105, 106 comprise essentially the same software as the main relay 103. Like the main relay 103, each of the sub-relays 105, 106 are multi-threaded processes. Accordingly, each sub-relay 105, 106 has a LogMgr, a Mgr, a record map, and utilizes a semaphore to synchronize each thread's use of its respective log file 110, 111.

Figure 6:
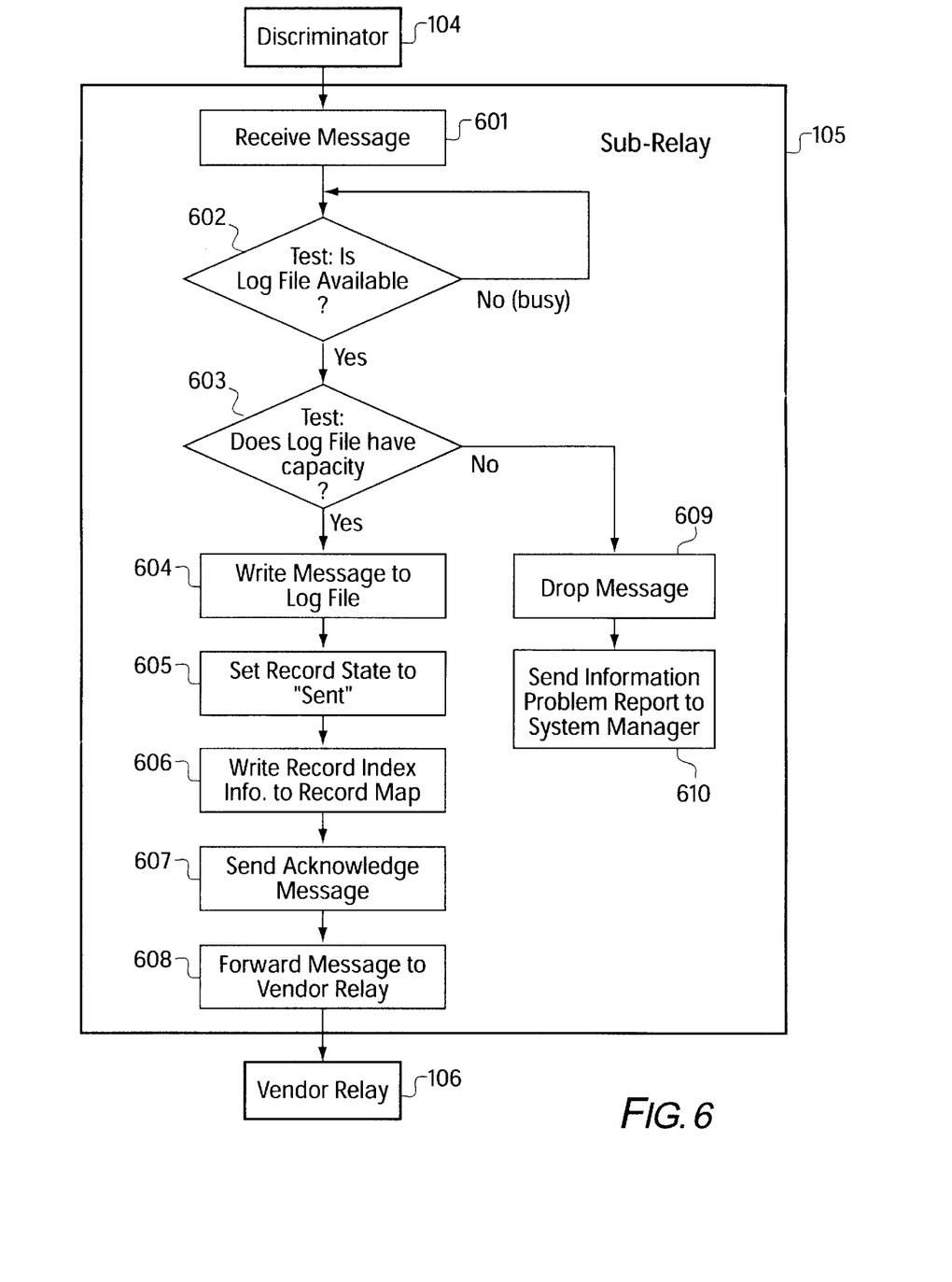
FIG. 6 is a flowchart of an exemplary sub-relay process.

Referring now to the flowchart of FIG. 6, sub-relay 105 receives a message from the discriminator 104 (step 601). The sub-relay 105 tests the semaphore associated with log file 110 to determine whether the log file 110 is available (step 602). If the log file 110 is busy, the sub-relay waits until the log file 110 becomes available. The sub-relay 105 tests to determine if the log file 110 is full (step 603). If the log file 110 is full, the sub-relay 105 drops the message (609) and sends an information problem report to the system manager (610).

If the log file 110 is available, the sub-relay 105 writes the message to the log file 110 (step 604). The sub-relay 105 then writes the record state to the log file 110, setting it as "sent" (step 605). The sub-relay 105 then writes the record index information into the record map (step 606). The sub-relay 105 then sends an acknowledgment message to the main relay 103, through the discriminator 104 (step 607). The sub-relay 105 then forwards the message to the vendor relay 106 assigned to the sub-relay 105 (step 608).

Once the vendor relay 106 receives the message, the vendor application associated with the vendor relay 106 processes the message in any manner chosen by the vendor.

Figure 7:
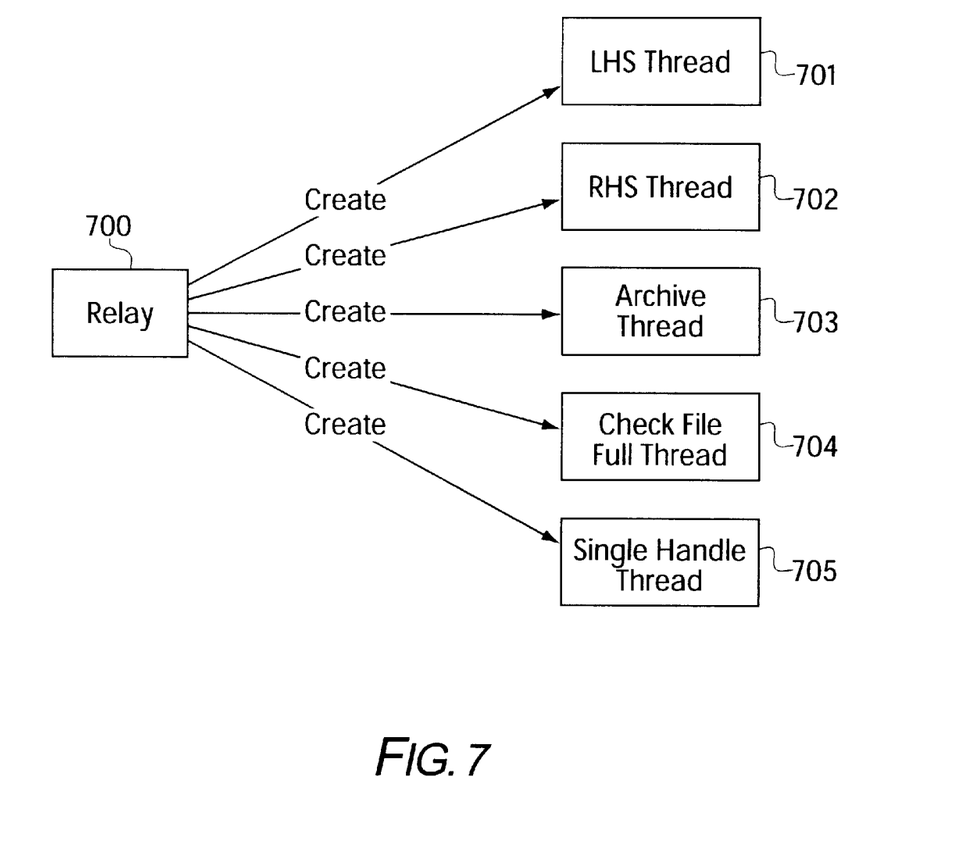
FIG. 7 shows the threads created by a relay in accordance with the exemplary embodiment of the present invention.

Relay Threads: FIG. 7 details the threads created by a relay 700. This relay 700 could be a main relay or a sub-relay, as both are constructed of essentially the same code and operate in the same manner. The relay 700 creates a Left Hand Side ("LHS") thread 701, a Right Hand Side ("RHS") thread 702, an Archive thread 703, a Check File Full Thread 704, and a Signal Handle thread 705. The use of multiple threads allows a relay to perform many functions at one time.

The relay 700 creates the LHS and RHS threads 701 and 702 to communicate with the processes connected to the left hand and right hand sides of the relay, respectively. For example, the LHS thread 701 of the main relay 103 communicates with the SLP 102, while the RHS thread 702 of the main relay 103 communicates with the discriminator 104. Correspondingly, the LHS thread 701 of a sub-relay 105, 106 communicates with the discriminator 104, while the RHS thread 702 of the sub-relay 105, 106 communicates with a vendor relay 107, 108.

The relay 700 creates the archive thread 703 to communicate with a client which is requesting the archiving of records from a log file 109, 110, or 111. This thread is created when the client sends a connection request to the relay 700, as described below.

The relay 700 also creates the check file full thread 704 to determine if the log file is filled above a threshold value, and to send an alarm message if it is.

Additionally, the relay 700 creates a signal handle thread 705, which enables multi-threaded processes to work with multiple clients by disabling a UNIX® signal that would otherwise prevent this function.

Figure 8:
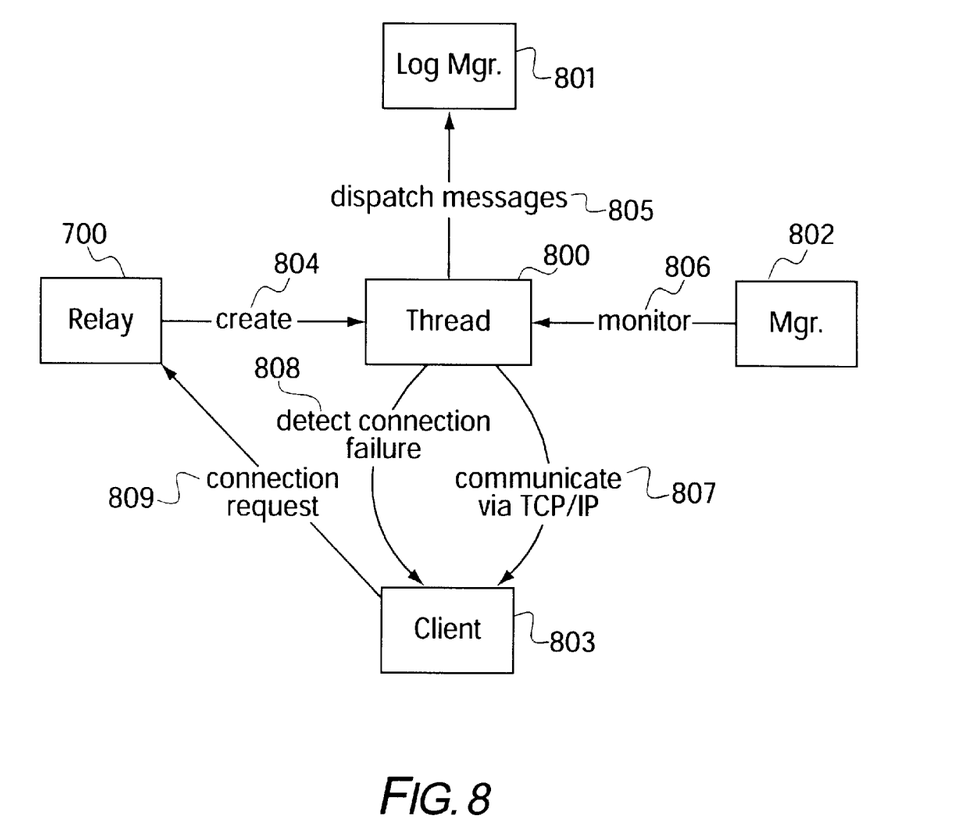
FIG. 8 shows the operations of a thread in accordance with the exemplary embodiment of the present invention.

FIG. 8 shows the interaction of a relay 700 and a client 803. The relay could be a main relay 103 or a sub-relay 105, 106. The client could be, for example, an archive process. In response to a connection request 809 from a client 803, the relay 700 will (if the client is recognized and the connection is accepted) create a thread 800 to communicate with the client 803. This thread-client communication 807 is carried out across a TCP/IP connection. The thread is also able to detect a connection failure 808.

The client can make requests for information from the log file (not shown in FIG. 8) through the LogMgr 801. The client 803 can send an information request message to the thread through the thread-client communication 807. The thread 800 then dispatches the message 805 to the LogMgr 801. The LogMgr 801 will then process the request contained in the message and perform the requested log file function.

The Mgr object 802 monitors 806 the operation of the thread for the relay 700.

Figure 9:
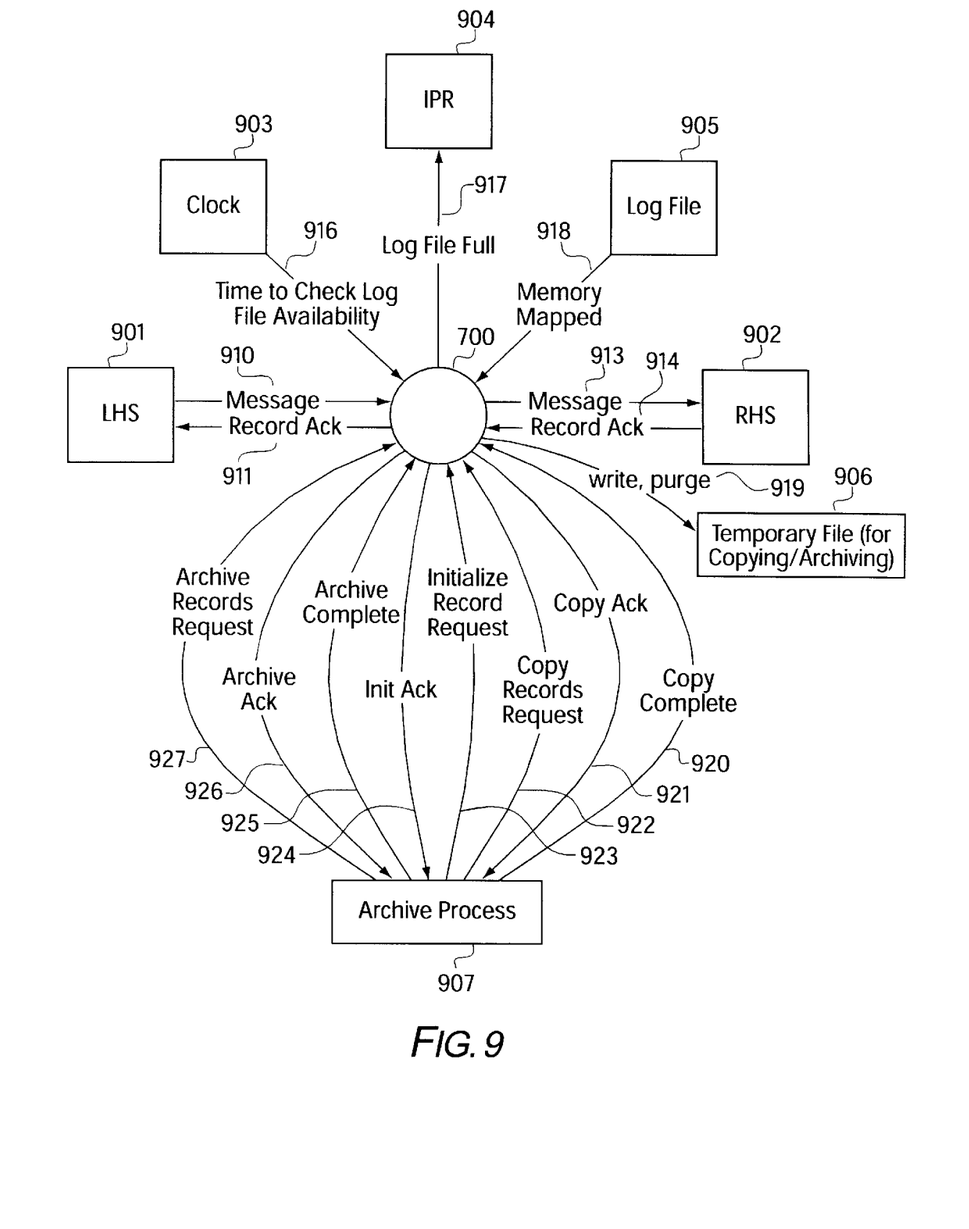
FIG. 9 shows the operations of an exemplary relay process.

FIG. 9 shows the operations of a relay 700 in communication with clients in the system. Because the relay 700 is a multi-threaded process, the functions shown in FIG. 9 can be carried out independently and simultaneously. The relay 700 acts as a server connected to several clients, including a Left Hand Side (LHS) 901 and a Right Hand Side (RHS) 902.

If the LHS 901 forwards a message 910 to the relay 700, the relay 700 sends a "record acknowledgment" message 911 back to the LHS 901 if the message is successfully received.

When the relay 700 forwards the message 913 to the RHS 902, the RHS 902 sends a "record acknowledgment" 914 message back to the relay 700 if the message is successfully received.

The Clock 903 is used to signal 916 the "Check File Full" thread 704, a thread which is usually in a "sleep" state, but periodically "wakes up" when signaled 916 by the clock 903 to check the availability of the log file 905.

The relay 700 has a log file 905, the availability of which is governed by how full (i.e., the percentage full) the log file 905 is. If the log file 905 is filled above a threshold capacity, the relay 700 sends a "log file full" message 917 to the Information Problem Report ("IPR") process 904. The IPR "sounds an alarm" by sending the "log file full" message to a maintenance operator via the HLR 101.

The memory of the log file 905 is mapped (indexed) 918 for the relay through a data structure of the relay 700 called the record map. This enables the relay 700 to search for and retrieve the messages in the log file 905.

When the Archive Process client 907 sends an archive records request 927 or a copy records request 922, the LogMgr of the relay 700 reads the requested records (e.g. all the records marked "acknowledged" or "sent") from the log file 905, and writes 919 them into a temporary file 906. The LogMgr then sends an archive acknowledge 926 or a copy acknowledge 921 message to the archive process 907. The archive process 907 then retrieves the data from the temporary file, and then sends an archive complete 925 or a copy complete 920 message to the relay 700. The relay 700 then purges 919 the temporary file 906.

The Archive Process client 907 can also send an initialize record request 923. The LogMgr will then clear the whole log file, and send back an initialization acknowledge message 924.

Figure 10:
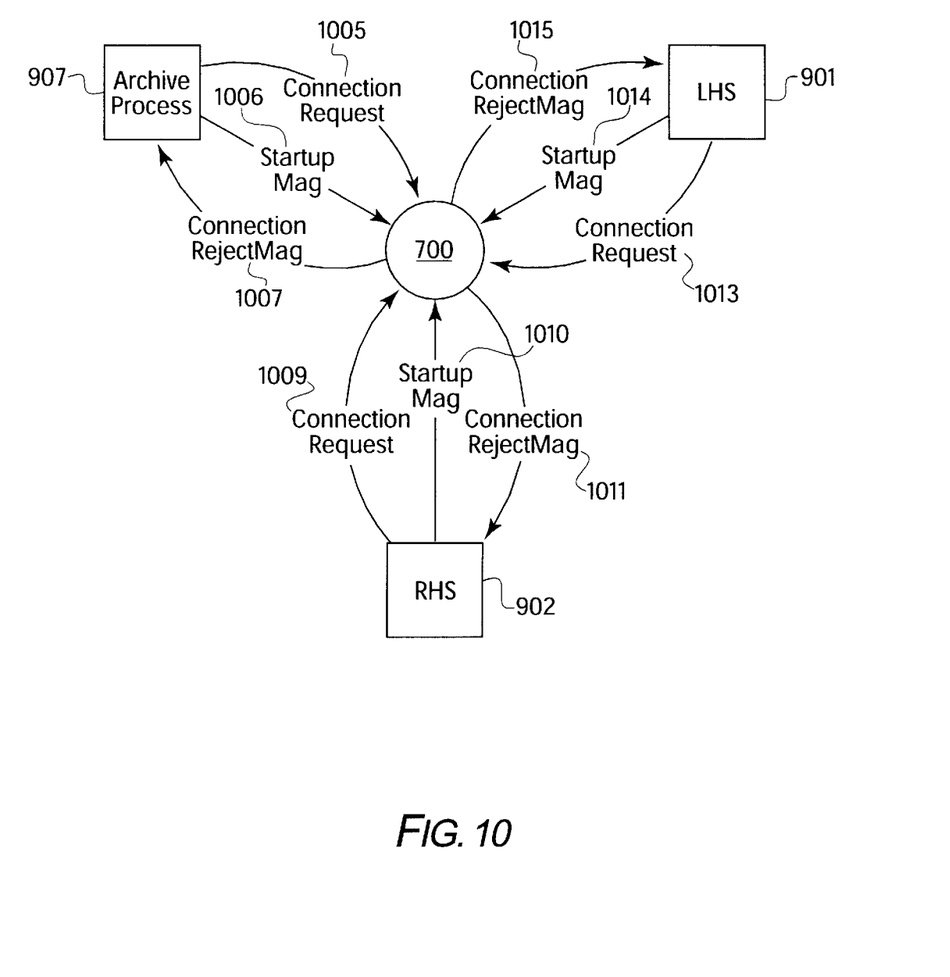
FIG. 10 shows the "handshaking" operations of the relay-client connections in accordance with the exemplary embodiment of the present invention.

FIG. 10 shows the "handshaking" operations of the relay-client connections. Each client (for example the LHS 901, the RHS 902, or an archive process 907) sends a connection request message 1005, 1009, 1013 to the relay 700. The connection request message 1005, 1009, 1013 contains information about the type of client sending the message. The relay 700 determines the type of client attempting to connect, and will accept the connection if it recognizes the client, and reject the connection if it does not recognize the client type. If the relay 700 rejects the connection, it will send a "connection reject" message 1007, 1011, 1015 to the client. If the relay 700 accepts the connection, the LHS 901, the RHS 902, or the archive process 907 will then send a "start up" message 1006, 1010, 1014 to the relay 700.

When the LHS 901, the RHS 902, or the archive process 907 is connected to the relay 700, that client is able to send or receive messages to/from the relay 700 and can request the relay 700 to retrieve files from the log, according to the procedures outlined above.

What is claimed is:

1. A method for relaying a message, comprising the steps of:

in a telecommunication network, receiving a message from a base station;

determining if the message is to be relayed to one of a plurality of remote units outside of the telecommunication network;

if the message is not to be relayed, processing the message within the telecommunication network; and if the message is to be relayed, creating a remote application message using information from the received message and information from a database in the telecommunication network, the information from the database being specific to the one of the plurality of remote units outside of the telecommunications network and relaying the remote application message to the remote unit outside of the telecommunications network, the remote unit processing the remote application message.

2. The method of claim 1, wherein the relaying step includes the steps of:

relaying the remote application message to a first process, the first process logging the remote application message to a first log file;

relaying the remote application message from the first process to a second process, the second process selecting one of a plurality of third processes, the second process relaying the remote application message to the selected third process;

at the selected third process, logging the remote application message to a respective second log file; and relaying the remote application message from the selected third process to the remote unit.

3. The method of claim 1, wherein the plurality of third processes includes at least one sub-relay process.

4. The method of claim 1, wherein the message is a remote feature control message.

5. A method for relaying a remote feature control message, the remote feature control message including a respective mobile identification number, comprising the steps of:

in a telecommunication network, receiving the remote feature control message;

searching a database for the respective mobile identification number of the remote feature control message, the database including a plurality of mobile identification numbers, the database associating at least some of the plurality of mobile identification numbers to at least one of a plurality of remote applications outside of the telecommunication network; and if the respective mobile identification number is found in the database and the respective mobile identification number is associated with one of the plurality of remote applications, forming a remote application message from information in the feature control message and information in the database specific to the one of the plurality of remote applications, and relaying the remote application message to the one of the plurality of remote applications, the remote application processing the remote application message.

6. The method of claim 5, further comprising the step of:

logging the remote application message in a log file.

7. The method of claim 6, further comprising the step of:

archiving the logged remote application message.

8. The method of claim 5, wherein the relaying step includes the steps of:

relaying the remote application message to a first process, the first process logging the remote application message to a first respective log file;

relaying the remote application message from the first process to a second process, the second process selecting one of a plurality of third processes, the second process relaying the remote application message to the selected third process;

at the third process, logging the remote application message to a second respective log file; and relaying the remote application message to the one of the plurality of remote applications.

9. The method of claim 8, wherein the selecting step includes the step of selecting one of the plurality of third processes as a function of the remote application.

10. A system for relaying a message, the message including a respective mobile identification number, comprising:

a home location register located within a telecommunication network and including a database, the database including a plurality of mobile identification numbers, the database associating at least some of the plurality of mobile identification numbers with at least one of a plurality of remote applications, the at least one of the plurality of remote applications being outside of the telecommunication network, the home location register receiving the message;

a main relay coupled to the home location register, the home location register transmitting the message to the main relay if a respective mobile identification number matches at least one of the plurality of mobile identification numbers in the database and the at least one of the plurality of mobile identification numbers is associated with any of the plurality of remote applications;

a discriminator coupled to the main relay, the main relay transmitting the message to the discriminator; and a plurality of sub-relays coupled to the discriminator, wherein the discriminator transmits the message to a selected one of the plurality of sub-relays, the selected one being associated with the one of the plurality of remote applications, the selected one transmitting the message to the remote application.

11. The system of claim 10, wherein the main relay includes a first log file, the main relay logging the message in the first log file.

12. The system of claim 11, wherein the selected one includes a second log file, the selected one logging the message in the second log file.

13. The system of claim 10, wherein the home location register further includes a service logic program, the service logic program determining whether the respective mobile identification number matches at least one of the plurality of mobile identification numbers in the database and whether the at least one of the plurality of mobile identification numbers is associated with one of the plurality of remote applications.

14. The system of claim 13, wherein the service logic program includes a plurality of service independent building blocks.

15. The system of claim 10 wherein the message is a remote feature control message.

16. A system for relaying a message, the message including a respective mobile identification number, comprising:

a service logic program executing on a processor within a telecommunication network, the service logic program processing the message; and a database coupled to the home location register, the database including a plurality of mobile identification numbers, at least one of the plurality of mobile identification numbers being associated with at least one of a plurality of remote applications, the at least one of the plurality of remote applications being outside of the telecommunication network;

wherein the service logic program determines whether the respective mobile identification number matches at least one of the plurality of mobile identification numbers associated with any of the plurality of remote applications, and if so, the service logic program causes the message to be relayed to a particular one of the plurality of remote applications associated with the matched at least one of the plurality of mobile identification numbers.

17. The system of claim 16, wherein the service logic program includes a plurality of service independent building blocks.

18. The system of claim 16, wherein the message is a remote feature control message.

19. The system according to claim 10, further comprising:

a service logic program which reformulates the message using information from the message and information from the database which is specific to a specific one of the plurality of remote application associated with a matching mobile identification number, the service logic program reformulating the message before the message is relayed to the main relay.

20. The system according to claim 16, wherein the service logic program is configured to reformulate the message using information from the message and information stored in the database which is specific to the particular one of the plurality of remote applications.

* * * * *